United States Patent
Sano

(10) Patent No.: US 7,251,303 B2
(45) Date of Patent: Jul. 31, 2007

(54) DIGITAL DATA RECEIVING APPARATUS AND METHOD WITH SYSTEM CHANGEOVER FUNCTION

(75) Inventor: Seiichi Sano, Higashiyamato (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 741 days.

(21) Appl. No.: 10/624,565

(22) Filed: Jul. 23, 2003

(65) Prior Publication Data

US 2004/0081264 A1    Apr. 29, 2004

(30) Foreign Application Priority Data

Jul. 26, 2002    (JP) .............................. 2002-217474

(51) Int. Cl.
*H04B 1/10*    (2006.01)
(52) U.S. Cl. ....................................................... 375/351

(58) Field of Classification Search ................ 375/267, 375/347, 349, 351
See application file for complete search history.

(56) References Cited

U.S. PATENT DOCUMENTS

| | | | |
|---|---|---|---|
| 4,615,040 A * | 9/1986 | Mojoli et al. ................ 375/267 |
| 6,038,264 A * | 3/2000 | Uesugi ........................ 375/316 |
| 6,480,557 B1 * | 11/2002 | Rog et al. .................... 375/349 |

FOREIGN PATENT DOCUMENTS

| | | |
|---|---|---|
| JP | 449730 | 2/1992 |
| JP | A-8-251151 | 9/1996 |
| JP | A-11-17669 | 1/1999 |

* cited by examiner

*Primary Examiner*—Don N. Vo
(74) *Attorney, Agent, or Firm*—Mattingly, Stanger, Malur & Brundidge

(57) ABSTRACT

A received, same signal is distributed to two channels, the received signals on the two channels are demodulated to produce a plurality of data streams on each of the two channels, and the plurality of data streams of one channel is selected to produce from the pluralities of data streams on the two channels.

4 Claims, 5 Drawing Sheets

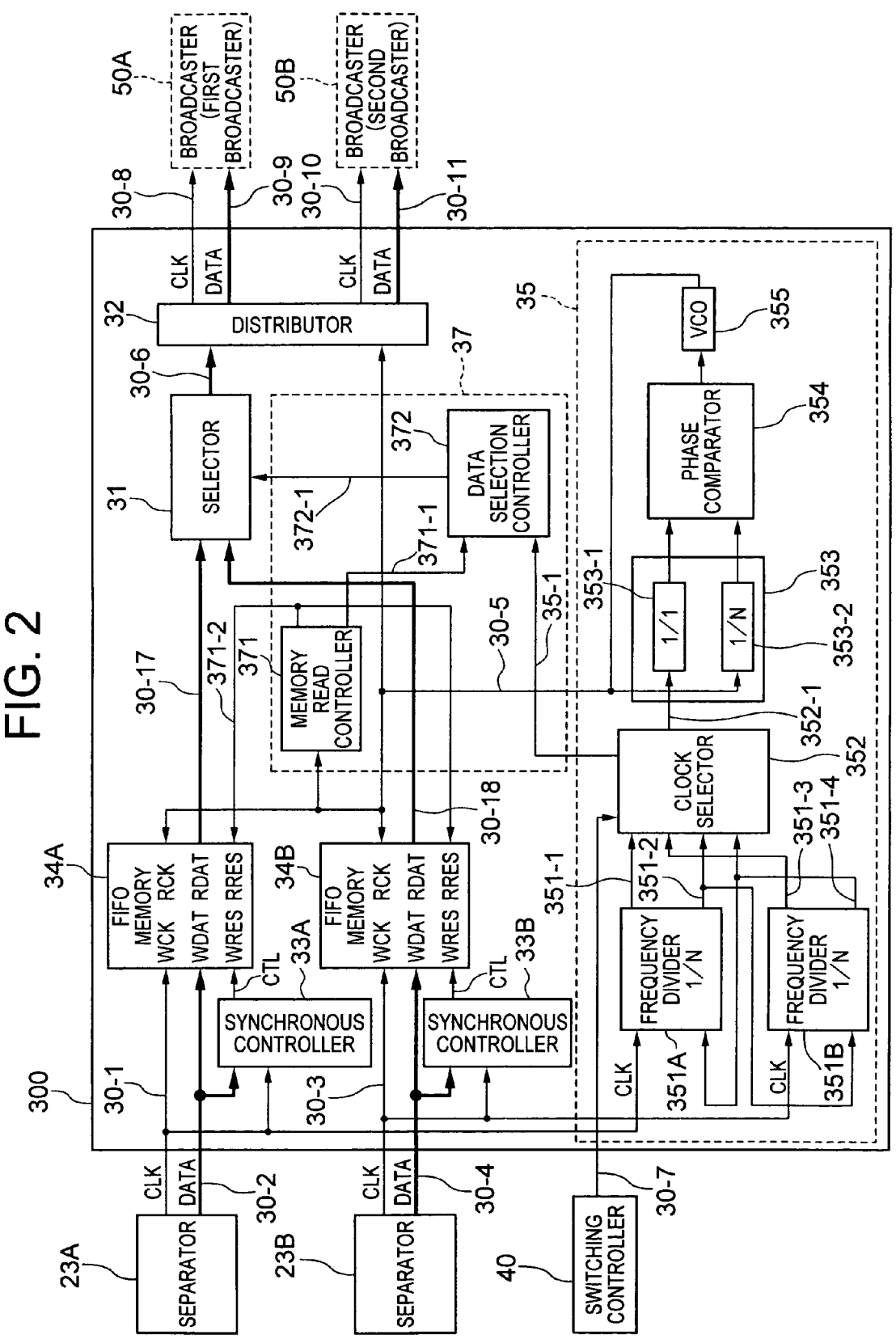

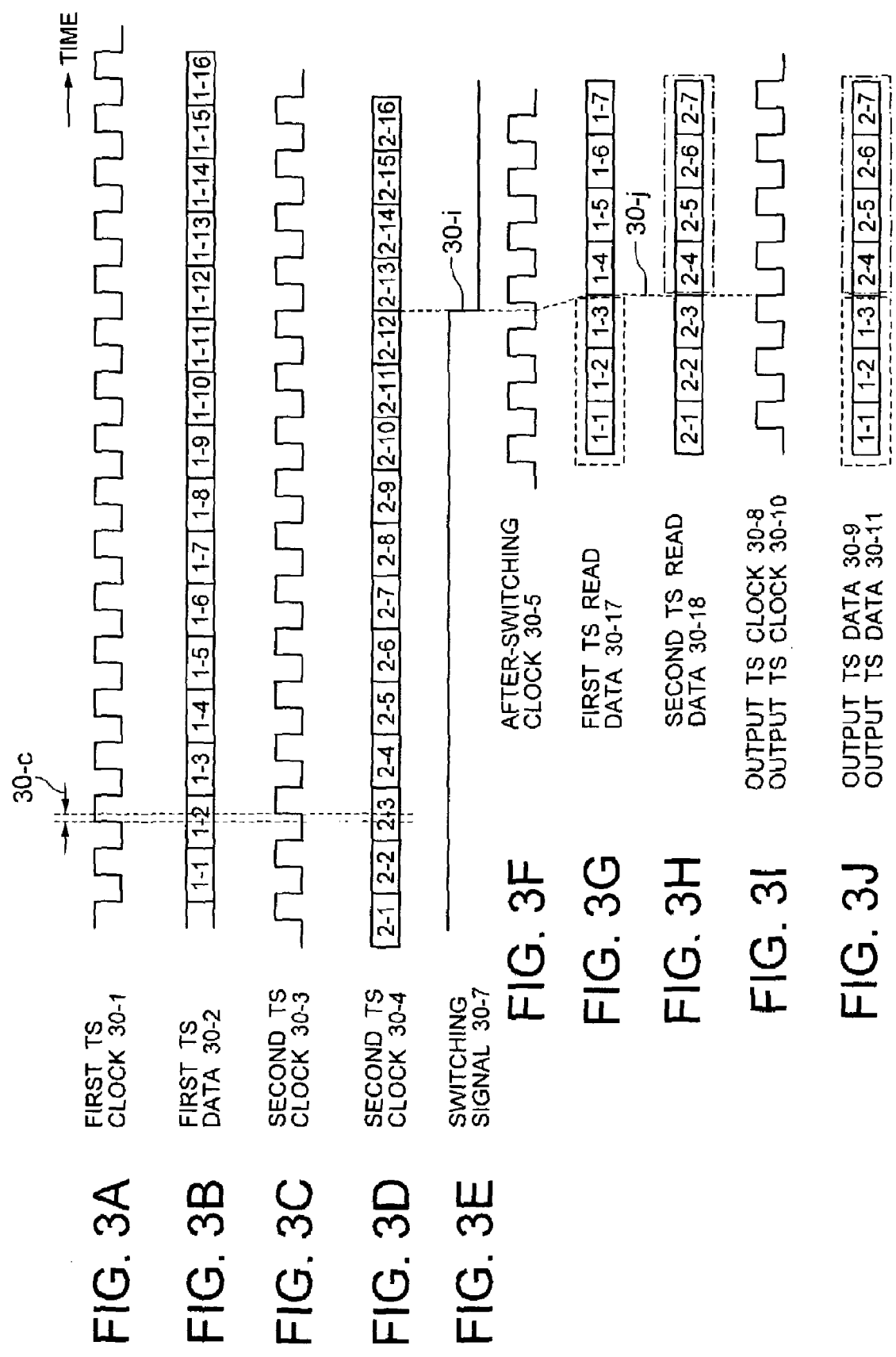

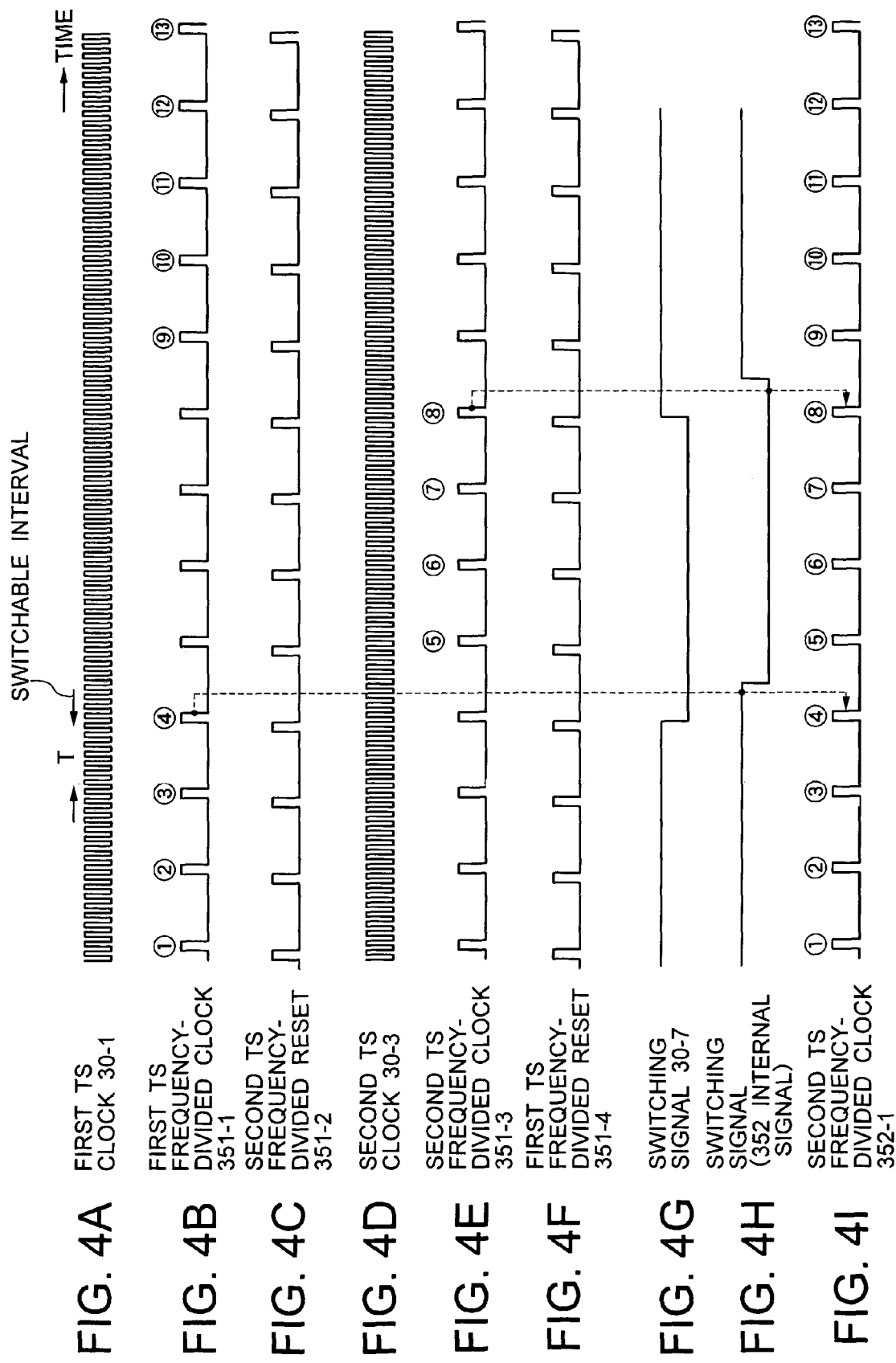

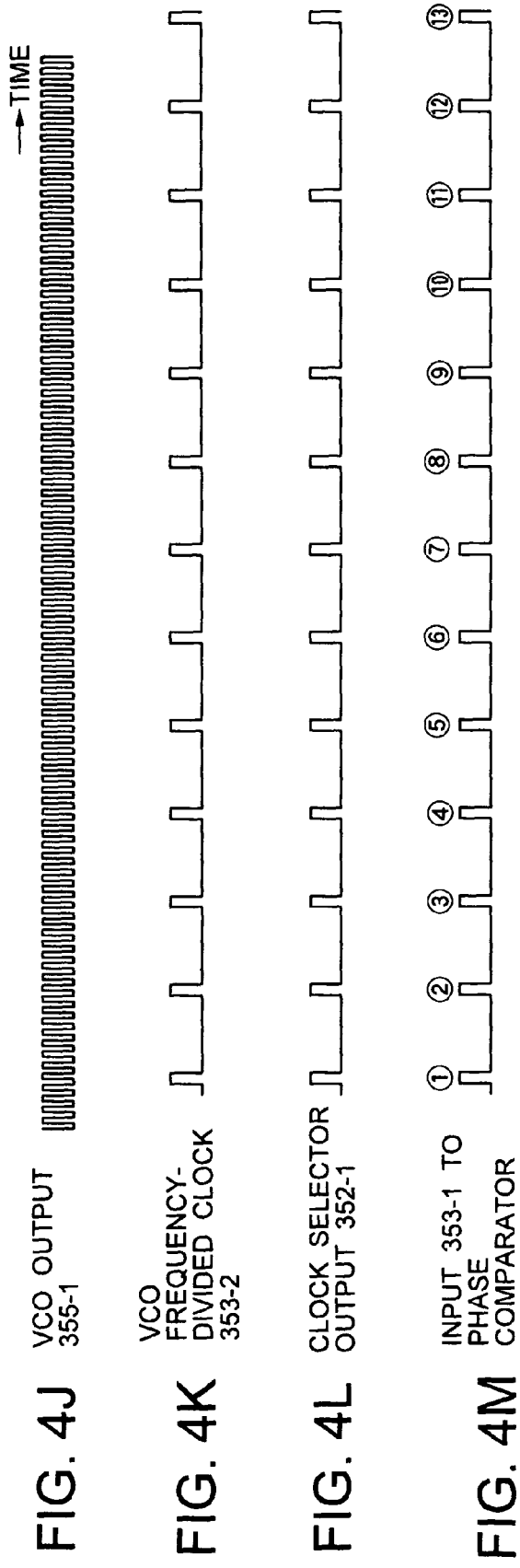

DIGITAL DATA RECEIVING APPARATUS AND METHOD WITH SYSTEM CHANGEOVER FUNCTION

BACKGROUND OF THE INVENTION

The present invention relates to an STL (Studio Transmitter Link) receiving apparatus and method for receiving a digital broadcast signal transmitted from a broadcasting station (studio) or the like to a transmitting station, and particularly to a digital data switching technique of receiving a digital broadcast signal by two or more separate receivers that are provided for spare purpose, and selecting one of the outputs from those receivers.

Of the STL (Studio Transmitter Link) receiving apparatus for receiving a digital broadcast signal from a broadcasting station (studio) or the like to a transmitting station, there is known a digital data receiving apparatus with system changeover function for receiving a digital broadcast signal by two or more receivers separately provided for backup purpose and for selecting one of the outputs from those receivers.

As an example of this prior art, JP-A-11-17669 discloses a phase-synchronizing circuit that causes the clocks and the phases of a plurality of pieces of data to be synchronized in the communication system with system changeover function. In this example, a phase-synchronizing circuit 6 is provided after a system changeover device 3.

As another example, JP-A-8-251151 (U.S. Pat. No. 2,715, 966) describes that an FIFO memory 2 is provided before a system changeover circuit 7 so that two separate signals to the system changeover circuit 7 are synchronized by the FIFO memory.

SUMMARY OF THE INVENTION

In the JP-A-11-17669, the system changeover device 3 sometimes causes dropout of output clock and data since the amounts of jitter produced in each signal scatter depending on the relation of the phase difference between the clock signals of the two separate input digital signals and the changeover timing of selecting the separate signals at any time. Therefore, when a signal is produced from the system changeover device 3 in which the dropout of output clock and data has been caused, the dropout cannot be reproduced in the following phase-synchronizing circuit 6 and optical transmitter circuit 10, thus resulting in the transmission of the signal with erroneous data.

In the JP-A-8-251151, the 1/N divider 12 of the read controller 1 for controlling the FIFO memory 2 to read out is controlled in its operation by the frame-synchronizing circuits 3, 4 in order for the frame pulse to be derived to be synchronized with the DATA R and DATA I of frame units. However, since the DATA R and DATA I must be converted to frame units, it is not easy to use the signals that are not synchronized with the frame pulse.

It is an object of the invention to provide a digital data receiving method and apparatus with the above drawbacks solved.

It is another object of the invention to provide a digital data receiving method and apparatus in which the received data can be prevented from being discontinuous when switching is made from one of the two or more separate output signals from the receivers to another.

In order to achieve the above objects of the invention, according to one aspect of the invention, there is provided a digital data receiving apparatus having:

a receiving portion that distributes the received same signal to two separate channels, and demodulates the received signals on the two channels to produce a plurality of data streams on each of two separate channels; and a switching portion for selecting the plurality of data streams of one channel from the two channels, and producing the plurality of data streams of the selected channel.

According to one example of the invention, the switching portion has:

memories for temporarily storing the plurality of data streams of each of the two channels at the clock included within the data stream on each channel;

a data read controller for simultaneously reading the temporarily stored data streams of the two channels from the memories; and a clock controller for generating a clock as a pair with the data stream that is selected by the switching portion and produced from the digital data receiving apparatus.

According to another example of the invention, the clock controller of the switching portion has:

frequency-dividers for generating clocks of 1/N (N is a positive number) the clock frequency of the data streams of each channel;

a frequency-division synchronizer for synchronizing the frequency dividers;

a selector for selecting one of the clocks of 1/N the clock frequency of the two channels; and a frequency multiplier for multiplying N times the clock of 1/N the clock frequency that is selected by the selector, so that the clock produced from the frequency-division synchronizer corresponds to the clock produced from the clock controller.

According to another example of the invention, in the clock controller of the switching portion, the constants N of the frequency dividers and multiplier are selected to be any integers between 4 and 8.

Other objects, features and advantages of the invention will become apparent from the following description of the embodiments of the invention taken in conjunction with the accompanying drawings.

BRIEF DESCRIPTION OF THE DRAWINGS

FIG. 2 is a block diagram showing an example of the construction of the system switching device of the digital data receiving apparatus of FIG. 1.

FIGS. 3A-3J are timing charts of the internal signal waveforms to which reference is made in explaining the operation of the digital data receiving apparatus of FIGS. 1 and 2.

FIGS. 4A-4M are timing charts of the internal signal waveforms to which reference is made in explaining the operation of the system switching device of FIG. 2.

DETAILED DESCRIPTION OF THE EMBODIMENT

Figure 1:
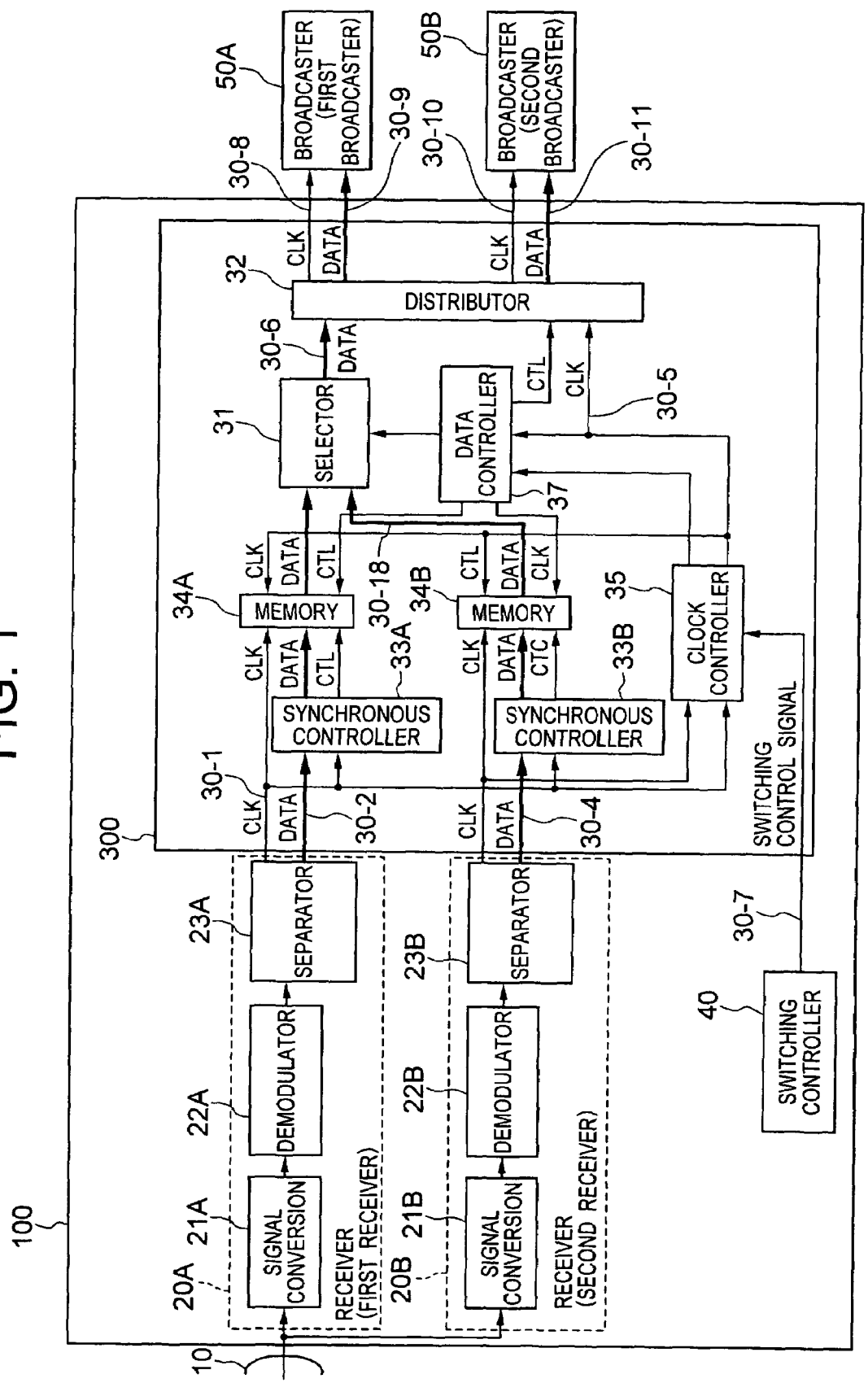
FIG. 1 is a block diagram showing the whole construction of an embodiment of the digital data receiving apparatus according to the invention.

An embodiment of the digital data receiving method and apparatus with system switching device will be described with reference to the accompanying drawings of FIGS. 1, 2, 3 and so on.

FIG. 1 is a block diagram of the whole construction of a digital data receiving apparatus with system switching device for system switching function according to this embodiment. FIG. 2 is a block diagram of the construction of the system switching device of FIG. 1. FIGS. 3A-3J are timing charts of the signal waveforms in respective portions of FIG. 2.

Referring to FIG. 1, an STL (Studio Transmitter Link) receiving apparatus 100 generates TS (Transport Stream) data and clocks on the basis of the digital broadcast signal received by an antenna 10, and supplies them to broadcasters 50A, 50B (first apparatus, and second apparatus). The receiving apparatus 100 has first and second receivers 20A, 20B, a switching controller 40 and a changeover switch 300. The receiving apparatus 100 supplies the digital broadcast signal received by the antenna 10 to the first and second receivers 20A, 20B. The input digital broadcast signals are converted to IF (Intermediate Frequency) signals by down converters 21A, 21B provided within the receivers 20A, 20B, and demodulated by demodulators 22A, 22B of the receivers, respectively. The digital data produced from the demodulator 22A, 22B are separated by separators 23A, 23B into TS (Transport Stream) data (DATA) and TS clock (CLK) that are included in the digital data. The first TS clock 30-1 (FIG. 3A) and first TS data 30-2 (FIG. 3B) produced from the first receiver 20A are supplied to a synchronizing controller 33A for the first apparatus, where a synchronous code is detected from the first data 30-2. The synchronizing controller 33A generates a control (write reset) signal CTL to a first memory 34A for the first apparatus is generated according to this synchronous code.

In other words, the first TS data 30-2 is written in the memory 34A in response to the first TS clock 30-1 and the control signal CTL generated from the first synchronizing controller 33A. Similarly, the second TS data 30-4 (FIG. 3D) is written in the second memory 34B in response to the second TS clock 30-3 and the control signal CTL generated from the second synchronizing controller 33B.

The first TS clock 30-1 and second TS clock 30-3 are supplied to a clock controller 35. One TS clock selected from these input first and second TS clocks 30-1, 30-3 by a clock selector 352 is supplied to a 1/1 multiplication PLL (353-355) within the clock controller 35, so that a 1/1 multiplication clock 30-5 (FIG. 3F) is generated by the 1/1 multiplication PLL. This clock 30-5 is used to control the memories 34A, 34B to read data.

This 1/1 multiplication clock 30-5 is supplied to both memories 34A, 34B for the first and second apparatus to read data from the memories. The 1/1 multiplication clock 30-5 is further supplied to a data controller 37 that is provided to generate control (read reset) signals to the first and second memories 34A, 34B.

Consequently, the first and second memories 34A, 34B are controlled in their reading operation in the same way by the control signal CTL (371-2) and the same clock (after-switching clock 30-5). Thus, as illustrated in FIGS. 3G and 3H, first TS read data 30-17 and second TS read data 30-18 produced from the memories 34A, 34B are synchronized with each other.

Thus, if a selector 31 makes switching from one of the first and second TS data 30-17, 30-18 to the other (for example, from the TS data 30-17 to the TS data 30-18) in response to the timing 30-i of a switching signal 30-7 (FIG. 3E) from the switching controller 40, the clock controller 35 and data controller 37 cooperate well together to create the timing 30-j good for the actual switching.

In other words, a switching signal 372-1 generated on the basis of the 1/1 multiplication clock 30-5 from the clock controller 35, controls the selector 31 to select the first TS read data 30-17 or second TS read data 30-18 at the time of timing 30-j, so that the selector 31 produces data 30-6.

The result is that both output TS clock 30-8 and output TS clock 30-10 are produced as the same clock based on the clock 30-5 that is generated by the 1/1 multiplication PLL within the clock controller 35. In addition, since the selector 31 is controlled to switch in response to the signal synchronized with the TS clock 30-5, the output TS data 30-9, 30-11, as illustrated in FIGS. 3G-3J, are still continuous even just before and after the data switching. That is, the data do not have any discontinuous interval even in the vicinity of the data switching.

Specific examples of the constructions of the clock controller 35 and data controller 37 of switch 300 of FIG. 1 and the operations thereof will be described in detail with reference to FIG. 2 to FIGS. 4A and 4M.

A frequency divider 351A in the clock controller 35 divides the frequency of the first TS clock 30-1 fed to the controller 35 by ratio N. Similarly, a frequency divider 351B in the controller 35 divides the input second TS clock 30-3 by N. The frequency divider 351A for the first TS clock 30-1 and the frequency divider 351B for the second TS clock 30-3 are arranged to reset the opponent's frequency-dividing operation by their outputs. That is, such a configuration that the reset signals 351-2 and 351-4 of the frequency dividers 351A and 351B are applied to the reset input terminals of the frequency dividers 351B and 351A, respectively, constitutes a so-called frequency division synchronizer.

The clock 351-1 resulting from dividing the first TS clock 30-1 by N and the clock 351-3 resulting from dividing the second TS clock 30-3 by N are produced from the frequency dividers 351A and 351B, respectively. These clocks 351-1, 351-3 are supplied to the clock selector 352. The clock selector 352 selects one of those clocks in response to the switching control signal 30-7 produced from the switching controller 40. The frequency-divided clock selected by the clock selector 352 is supplied through a 1/1 frequency divider 353-1 of the frequency divider 353 directly to a phase comparator 354. The output from the phase comparator 354 is supplied to a VCO (Voltage Controlled Oscillator) 355, and the VCO 355 generates a clock signal of the frequency according to the input signal. The output signal from the VCO 355 is fed to a 1/N frequency divider 353-2 of the divider 353 where its frequency is divided by N. The phase of the clock produced from the frequency divider 353-2 and the phase of the clock (output clock from the frequency divider 353-1) selected by the clock selector 352 are compared with each other by the phase comparator 354, thus a signal corresponding to the phase difference being produced from the phase comparator 354.

In the data controller 37, a memory read controller 371 generates a timing signal 371-1 for controlling the FIFO memories 34A, 34B to read, and supplies the signal 371-1 to a data selection controller 372. The data selection controller 372 is responsive to the data-switchable timing signal 371-1 from the memory read controller 371 and the signal (clock selection information) 35-1 from the clock selector 352 to supply the data selection information 372-1 to the selector 31.

The frequency-dividing ratios N of the dividers 351A, 351B and 353-2 are preferably set to be an integer within the range of, for example, 4~8. In other words, under the preferably selected dividing ratios N, it is possible to preferably stabilize the operations of the phase comparator 354 and VCO 355, and to increase the precision of the frequency of the synchronizing clock 30-5 that is fed to the memories 34A, 34B, memory read controller 371 and distributor 32.

That is, the period of the synchronizing clock 30-5 can be optimized, and the delay of the data selection information 372-1 from the data selection controller 372 can be minimized.

The operation of the arrangement of FIG. 2 will be described in detail with reference to the signal waveforms of FIGS. 4A to 4M. The first TS clock signal 30-1 separated by the separator 23 is obtained as a clock signal of the rectangular shape shown in FIG. 4A. While the clock signal 30-1 is a rectangular wave of duty ratio 50% as illustrated, the duty ratio may be another value than 50%. This first TS clock signal 30-1 is supplied to the frequency divider 351A, and divided in its frequency by N. In this example, the clock signal 30-1 is divided in its frequency by 8, and as a result the first TS frequency-divided clock signal 351-1 of duty ratio 12.5% is produced (FIG. 4B). This frequency-divided clock signal 351-1 and the frequency-divided clock signal 351-3 of the second TS clock signal 30-3 which will be described later are both set to have a duty ratio of, for example, 12.5% so that the LOW-level period and HIGH-level period of those signals can be made greatly different. The duty ratio is desired to be closer to 100% or 0% away from 50%.

Similarly, the second TS clock signal 30-3 is separated as a clock signal of duty ratio 50%, and divided in its frequency by 8 on the frequency divider 351B for the second TS clock, thus the second TS frequency-divided clock signal 351-3 (FIG. 4F) being produced as illustrated.

The frequency divider 351A for the first TS clock and the frequency divider 351B for the second TS clock also produce reset signals synchronized with the frequency-divided clocks, respectively. In other words, the second TS frequency-divided reset signal 351-2 (FIG. 4C) produced from the frequency divider 351A for the first TS clock is supplied to the reset signal input terminal of the frequency divider 351B for the second TS clock, while the first TS frequency-divided reset signal 351-4 (FIG. 4F) produced from the frequency divider 351B for the second TS clock is supplied to the reset signal input terminal of the frequency divider 351A for the first TS clock. These reset signals 351-2, 351-4 are of the same waveform and produced a half phase of TS clock earlier than the corresponding frequency-divided clocks 351-1, 351-3, respectively. Therefore, the deviation between the frequency-dividing start times of the two frequency dividers 351A, 351B is made within a predetermined period. Thus, the period in which the longer periods of the frequency-divided clocks 351-1, 351-3 overlap on each other in the first and second TS clocks can be extended to more than a predetermined period. This overlapping period is called the switchable period (interval) T (see FIG. 4A).

Under the above arrangement, even if the TS clock has a short period, the switching period can be extended according to the value of the frequency-dividing ratio N. Thus, data can be switched with the discontinuous interval of TS data being not caused by the effect of the jitter of TS clock.

The data switching operation will be described below. In the embodiment of the invention, the switching signal 30-7 is supplied to the clock selector 352 according to the timing of only the operation of the switching controller 40 without being synchronized with the TS clock and TS data. Therefore, the clock selector 352 generates a switching signal (FIG. 4H) resulting from delaying the input switching signal 30-7 (FIG. 4G) up to about the mid point of the switchable period from the timing of the input switching signal. This delayed switching signal causes the clock selector 352 to make switching from one of the input first TS frequency-divided clock signal 351-1 and second TS frequency-divided clock signal 351-3 to the other at the time according to the timing of the delayed switching signal. Thus, the TS clock and TS data can be prevented from being lost and discontinuous in the vicinity of the switching and selection operation.

When the TS frequency-divided clocks are switched at the time of the timing in the vicinity of the mid point of the switchable period (T), the ratio of the phase difference between the frequency-divided clocks to the period of the TS frequency-divided clocks is greatly reduced as compared with the ratio of the phase difference between the frequency-divided clocks to the period of the TS clocks. Thus, the phase error between the output signal 352-1 from the clock selector 352 and the signal resulting from dividing the frequency of the output from VCO 355 by N (8 in this figure) at the above switching time is also reduced, so that the phase variation of the output from the VCO 355 can be more slowed down.

Thus, according to the invention, the changeover switch 300 does not switch the TS clocks 30-1, 30-3 directly fed from the first and second receivers 20A, 20B, but generates the continuous clocks 351-1, 351-3 of the same frequency synchronized with the input TS clocks within its inside. Then, the switch 300 selects one of the clocks 351-1, 351-3 as the clock 352-1, and generates the TS clock based on the clock 352-1 thereby to supply the TS clock to the outside. In addition, the TS data 30-2, 30-4 from the receivers 20A, 20B are not directly switched to produce, but within the changeover switch 300 the input TS data are stored in memories 34A, 34B, and read from the memories 34A, 34B as read data which are then switched to produce as TS data.

As a result, we can propose a digital data receiving apparatus in which, even if the receivers 20A, 20B are switched during the operation, the TS clock and TS data are not discontinuous and thus seamless switching can be achieved without any trouble such as freeze on the images and sounds.

In the above embodiment, the same received signal is distributed to two routs or channels, the received signals on the two channels are demodulated to produce a plurality of data streams on each of the two channels, and the plurality of data streams on one of the two channels is selected and produced. However, in this invention, it is possible to distribute the same received signal to three or more channels, demodulate the received signals on the three or more channels to produce a plurality of data streams on each of the three or more channels, and select and produce the plurality of data streams of one of the three or more channels.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A digital data receiving apparatus comprising:
   a receiving portion for distributing a received same signal to two channels, and demodulating said received signals on said two channels to produce a plurality of data streams on each of said two channels; and
   a switching portion for selectively producing said plurality of data streams of one of said two channels,
   wherein said switching portion comprises:
   memories for temporarily storing said plurality of data streams of each of said two channels at the clocks within the data streams of each of said two channels;

a data read control portion for controlling said memories to simultaneously read out said temporarily stored data streams of each of said two channels; and a clock control portion for controlling clocks to be generated as a pair with said data streams that are selected by said switching portion and produced from said digital data receiving apparatus.

2. A digital data receiving apparatus according to claim 1, wherein said clock control portion of said switching portion comprises:

frequency dividers for generating clocks of 1/N (N is a positive number) the clock frequency of said data streams of each of said two channels;

a frequency-division synchronizer for synchronizing said frequency dividers;

a selector for selecting one of said clocks of 1/N the clock frequency of said data streams of each of said two channels from said frequency dividers; and a multiplier for multiplying said selected clock of 1/N the clock frequency by N, and the output clock from said frequency-division synchronizer is the output clock from said clock control portion.

3. A digital data receiving apparatus according to claim 1, wherein the constant N of said frequency dividers and said multiplier in said clock control portion of said switching portion is any integer within a range of 4~8.

4. A digital data receiving method comprising the steps of:

a) distributing a received same signal to two channels;

b) demodulating said received signals on said two channels to produce a plurality of data streams on each of said two channels; and c) selecting and producing said plurality of data streams of one of said two channels, wherein said step c) comprises the steps of:

temporarily storing said plurality of data streams of each of said two channels at the clocks within said data streams of each of said two channels;

simultaneously reading out said temporarily stored data streams of said two channels;

selectively producing said plurality of data streams of one of said two channels simultaneously read out as above; and generating clocks as a pair with said produced data streams.

* * * * *